(12) United States Patent
Hinrichs et al.

(10) Patent No.: US 11,062,093 B2
(45) Date of Patent: Jul. 13, 2021

(54) SYSTEM AND METHOD FOR GENERATING SUBJECTIVE WELLBEING ANALYTICS SCORE

(71) Applicant: TSG Technologies, LLC, St. Louis, MO (US)

(72) Inventors: Anthony L Hinrichs, St. Louis, MO (US); Andrea E DiGiovanni, St. Louis, MO (US); Willem S Maritz, St. Louis, MO (US); Anthony M Sardella, St. Louis, MO (US)

(73) Assignee: TSG Technologies, LLC, St. Louis, MO (US)

(*) Notice: Subject to any disclaimer, the term of this patent is extended or adjusted under 35 U.S.C. 154(b) by 213 days.

(21) Appl. No.: 16/278,326

(22) Filed: Feb. 18, 2019

(65) Prior Publication Data
US 2020/0265115 A1    Aug. 20, 2020

(51) Int. Cl.
*G06F 40/35*  (2020.01)
*G06F 16/387*  (2019.01)
*G06F 16/35*  (2019.01)
*G06F 16/31*  (2019.01)

(52) U.S. Cl.
CPC ............ *G06F 40/35* (2020.01); *G06F 16/313* (2019.01); *G06F 16/353* (2019.01); *G06F 16/387* (2019.01)

(58) Field of Classification Search
CPC ...... G06F 40/35; G06F 16/353; G06F 16/313; G06F 16/387
See application file for complete search history.

(56) References Cited

U.S. PATENT DOCUMENTS

| | | | |
|---|---|---|---|
| 2013/0138577 A1* | 5/2013 | Sisk | G06Q 40/04 705/36 R |
| 2014/0164302 A1* | 6/2014 | Di Fabbrizio | G06Q 30/0631 706/46 |
| 2015/0120633 A1* | 4/2015 | Norlander | G16H 20/70 706/46 |
| 2015/0148061 A1* | 5/2015 | Koukoumidis | H04W 4/022 455/456.1 |
| 2017/0235888 A1* | 8/2017 | Rahman | G06F 40/295 705/3 |
| 2018/0027371 A1* | 1/2018 | Austraat | H04M 1/72454 455/456.3 |
| 2018/0336963 A1* | 11/2018 | Burke | G16H 40/67 |
| 2019/0036931 A1* | 1/2019 | Olesen | H04L 63/10 |
| 2019/0079934 A1* | 3/2019 | Liao | G06F 16/248 |
| 2019/0347287 A1* | 11/2019 | Crossno | G06Q 30/0269 |

* cited by examiner

*Primary Examiner* — Michael Colucci
(74) *Attorney, Agent, or Firm* — Fresh IP PLC; John R. Bednarz

(57) ABSTRACT

A system includes at least one processor to perform natural language processing on text from at least one document and assign the at least one document to at least one subjective wellbeing dimension by comparing the text from the at least one document with a subjective wellbeing dimension filter for each subjective wellbeing dimension, insert the at least one document into at least one bin, each bin associated with a particular subjective wellbeing dimension, and analyze each document in each bin associated with the particular subjective wellbeing dimension to determine a score for each subjective wellbeing dimension and an overall score that is based on each score for each subjective wellbeing dimension.

18 Claims, 8 Drawing Sheets

FIG. 7

Table 702:

| volume | binned raw score | city | bin_dimension | week | dimension score | Smoothed Dimension score |
|---|---|---|---|---|---|---|
| 1226 | 0.117903752 | StLouis | accomplishment | 2017-05-28 | 85.28299728 | |
| 2400 | 0.116541667 | StLouis | accomplishment | 2017-06-04 | 84.71883556 | |
| 2393 | 0.086941078 | StLouis | accomplishment | 2017-06-11 | 69.09532094 | |
| 2336 | 0.110295377 | StLouis | accomplishment | 2017-06-18 | 81.95603624 | |
| 2471 | 0.103905301 | StLouis | accomplishment | 2017-06-25 | 78.81291423 | |
| 2286 | 0.088724625 | StLouis | accomplishment | 2017-07-02 | 70.20276439 | |
| 2195 | 0.088633257 | StLouis | accomplishment | 2017-07-09 | 70.14647391 | |
| 2387 | 0.048847926 | StLouis | accomplishment | 2017-07-16 | 42.92740066 | 72.89213387 |
| 2326 | 0.0562767687 | StLouis | accomplishment | 2017-07-23 | 48.15604928 | 67.39522603 |
| 2152 | 0.094098513 | StLouis | accomplishment | 2017-07-30 | 73.42492678 | 88.73515953 |

Table 704:

| dimension | topic_name | importance | abs(releva | fulfillment | relevant |
|---|---|---|---|---|---|
| fulfillment | Topic0 | 0.304615102 | 1.080808 | -1.080808417 | -1.080808417 |
| fulfillment | Topic1 | -0.192869955 | 5.25827 | -5.258270334 | -5.258270334 |
| fulfillment | Topic2 | -0.311810712 | 4.536817 | -4.5386168 | -4.5386168 |
| fulfillment | Topic3 | -0.460386153 | 3.648814 | -3.648813893 | -3.648813893 |
| fulfillment | Topic4 | 0.014114291 | 2.396128 | -2.396127997 | -2.396127997 |
| fulfillment | Topic5 | 1.303579745 | 0.632463 | -0.632462229 | -0.632462229 |
| fulfillment | Topic6 | -0.810837212 | 1.085492 | -1.08549242 | -1.08549242 |

Table 706:

| topic | sentiment | dimension | affect | volume | sentimen | positive | neutral | negative | Overall risk |
|---|---|---|---|---|---|---|---|---|---|
| fulfillment: Topic0 | 0.290091 | fulfillment | -1.080808417 | 1534 | 0.2901 | 716 | 547 | 271 | 2.207699609 |
| fulfillment: Topic1 | 0.546591 | fulfillment | -5.258270334 | 4116 | 0.5486 | 2621 | 1132 | 363 | 1.430712026 |
| fulfillment: Topic2 | 0.572562 | fulfillment | -4.5386168 | 3528 | 0.5726 | 2362 | 824 | 342 | 1.404967375 |
| fulfillment: Topic3 | 0.641246 | fulfillment | -3.648813893 | 2439 | 0.6412 | 1716 | 571 | 152 | 1.553311193 |
| fulfillment: Topic4 | 0.33758 | fulfillment | -2.396127997 | 2355 | 0.3376 | 1121 | 908 | 326 | 1.941543884 |
| fulfillment: Topic5 | 0.067208 | fulfillment | -0.632462229 | 4925 | 0.0672 | 1866 | 1524 | 1535 | 1.906208122 |
| fulfillment: Topic6 | 0.453535 | fulfillment | -1.08549242 | 990 | 0.4535 | 559 | 321 | 110 | 1.363376667 |

| affect | focus | health | purpose | relationships |
|---|---|---|---|---|
| -1.080808417 | -0.076814106 | -0.129126395 | 0.042097244 | -0.062231944 | 0.003348536 |
| -5.258270334 | -0.83266243 | -0.531214206 | -0.134203492 | -0.242974484 | -0.390828633 |
| -4.5386168 | -0.286254878 | -0.469207291 | -0.208519496 | -1.08597889 | -3.12233713 |
| -3.648813893 | -0.274623079 | -0.201786566 | -0.099912277 | -0.166130311 | -0.334750209 |
| -2.396127997 | -0.156210445 | -0.403333204 | -0.241025058 | -0.222000509 | -0.154366875 |
| -0.632462229 | 0.065744693 | -0.210821138 | 0.060333637 | -0.094639973 | 0.209643875 |
| -1.08549242 | -0.053136718 | -0.053693676 | -0.488386849 | -0.201000372 | -0.073072082 |

SYSTEM AND METHOD FOR GENERATING SUBJECTIVE WELLBEING ANALYTICS SCORE

BACKGROUND

Civic and business leaders in cities and metropolitan areas throughout the United States struggle to understand the current barometer of citizens. The leaders are tasked with making decisions that affect the citizens but often do not understand what the citizens think or believe about particular issues and topics including current events in our nation and throughout the world. Very often, this can lead to economic and social issues that could be avoided if the leaders better understood their citizens. Many citizens publish their thoughts and beliefs using social media and other platforms and often data associated with this social media is publicly available. This data represents a firehose of information that continues to grow and change with time. Conventionally, the information in this data has not been utilized to better understand topics and issues that are currently impacting citizens and are deemed to be the most important to the citizens.

It is with these issues in mind, among others, that various aspects of the disclosure were conceived.

SUMMARY

According to one aspect, a system for generating a subjective wellbeing analytics score may include a server computing device that receives streams of documents from a plurality of sources. The server computing device may include a subjective wellbeing analytics application that may collect at least one document, generate the subjective wellbeing analytics score based on the at least one document, and transmit the subjective wellbeing analytics score to a client computing device.

In one example, the server computing device may collect at least one document from at least one document source, insert the at least one document into a queue, and store the at least one document in a database such as a data lake. The at least one document may be associated with a particular city or metropolitan area and may be associated with a particular period of time such as a particular week. The at least one document source may be a social media stream. Next, the server computing device may perform processing on the at least one document and index the at least one document. The server computing device may perform natural language processing on the at least one document and assign the at least one document to at least one subjective wellbeing dimension. Next, the server computing device may insert the at least one document into at least one bin. Each subjective wellbeing dimension may have a particular bin. Next, the server computing device may determine a score for each subjective wellbeing dimension and an overall score based on the subjective wellbeing dimensions.

According to an aspect, a system includes a memory having instructions stored thereon and at least one processor to execute the instructions to collect at least one document from at least one document source, the at least one document associated with a particular geographic location and a particular period of time, insert the at least one document into a queue for processing, store the at least one document in a data lake, and assign the at least one document an index, perform natural language processing on the at least one document to obtain text from the at least one document and assign the at least one document to at least one subjective wellbeing dimension by comparing the text from the at least one document with a subjective wellbeing dimension filter for each subjective wellbeing dimension, insert the at least one document into at least one bin, each bin associated with a particular subjective wellbeing dimension, and analyze each document in each bin associated with the particular subjective wellbeing dimension to determine a score for each subjective wellbeing dimension and an overall score that is based on each score for each subjective wellbeing dimension.

According to another aspect, a method includes collecting, by at least one processor, at least one document from at least one document source, the at least one document associated with a particular geographic location and a particular period of time, inserting, by the at least one processor, the at least one document into a queue for processing, storing the at least one document in a data lake, and assigning the at least one document an index, performing, by the at least one processor, natural language processing on the at least one document to obtain text from and assigning the at least one document to at least one subjective wellbeing dimension by comparing the text from the at least one document with a subjective wellbeing dimension filter for each subjective wellbeing dimension, inserting, by the at least one processor, the at least one document into at least one bin, each bin associated with a particular subjective wellbeing dimension, and analyzing, by the at least one processor, each document in each bin associated with the particular subjective wellbeing dimension to determine a score for each subjective wellbeing dimension and an overall score that is based on each score for each subjective wellbeing dimension.

According to an additional aspect, a non-transitory computer-readable storage medium includes instructions stored thereon that, when executed by a computing device cause the computing device to perform operations, the operations including collecting at least one document from at least one document source, the at least one document associated with a particular geographic location and a particular period of time, inserting the at least one document into a queue for processing, storing the at least one document in a data lake, and assigning the at least one document an index, performing natural language processing on the at least one document to obtain text from the at least one document and assigning the at least one document to at least one subjective wellbeing dimension by comparing the text from the at least one document with a subjective wellbeing dimension filter for each subjective wellbeing dimension, inserting the at least one document into at least one bin, each bin associated with a particular subjective wellbeing dimension, and analyzing each document in each bin associated with the particular subjective wellbeing dimension to determine a score for each subjective wellbeing dimension and an overall score that is based on each score for each subjective wellbeing dimension.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 7 illustrates example tables of data associated with the system for generating the subjective wellbeing analytics score according to an example embodiment.

DETAILED DESCRIPTION

Figure 1:
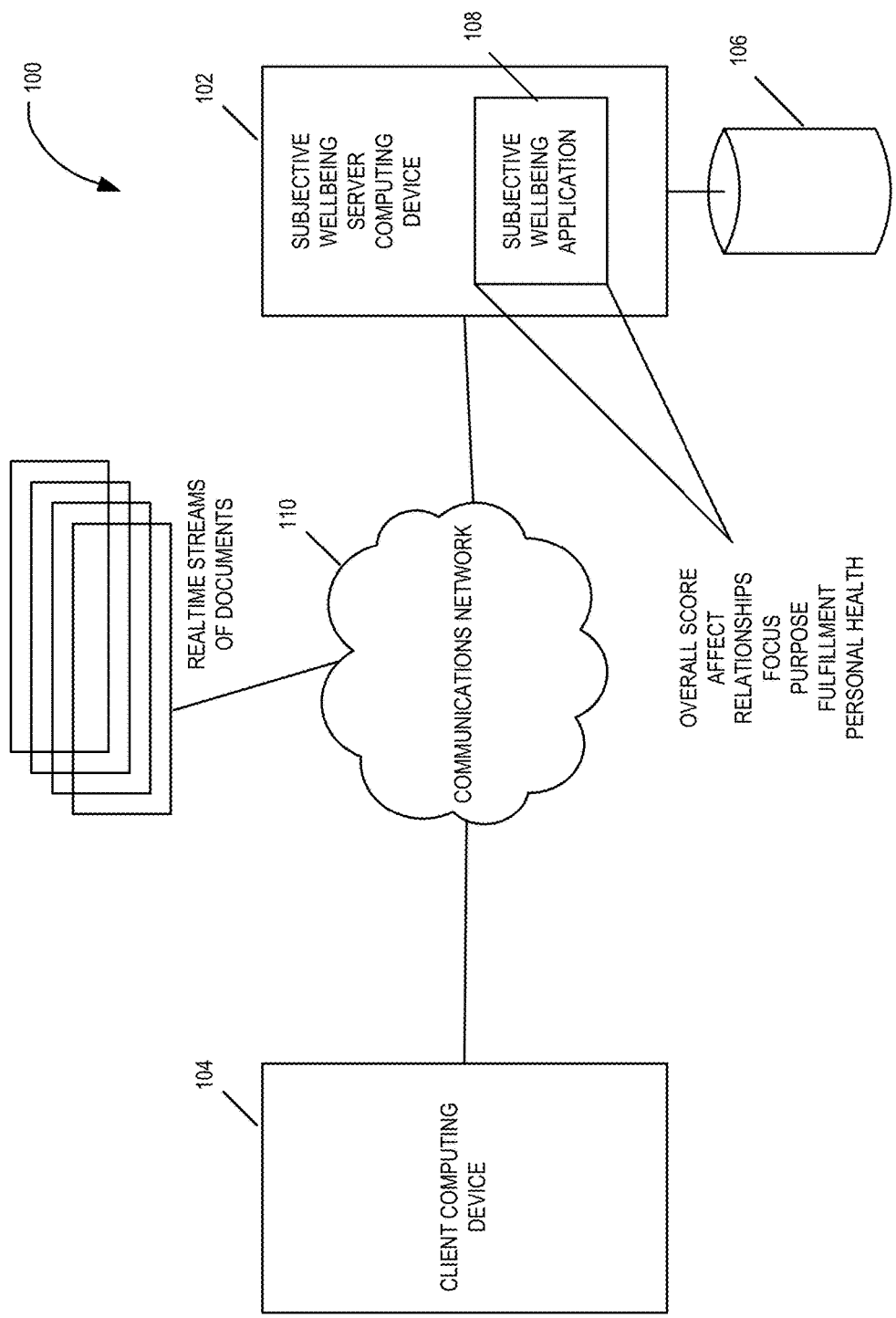
FIG. 1 is a block diagram of a system for generating a subjective wellbeing analytics score according to an example embodiment.

Aspects of a system and method for generating a subjective wellbeing analytics score includes a server computing device that may include a subjective wellbeing analytics application that may collect at least one document from at least one document source and generate a subjective wellbeing analytics score based on the at least one document. A document may be a data object created by a single person or multiple authors and may have a time when it was published. A document or article may be a social media post, a blog post, a forum post, a traditional news media article, or an academic research paper, among others.

The system and method provide a way to measure subjective wellbeing using digital and social media available via the internet. Digital and social media is a vast and continuously-updating source of biographical, citizen-authored text. When the data associated with the social media is anonymized and aggregated, it can create a powerful and ethical data source that may be used for psychology-based analytics, which can be used without compromising citizen privacy. The system discussed herein applies data science processing to this powerful data source to measure subjective wellbeing on an ongoing basis, providing persistent, near-realtime insight into community subjective wellbeing. This can be used to provide a direct, key performance indicator to evaluate the impact and efficacy of city and metropolitan programs and support resource allocation decisions. Conventionally, the information in this data has not been utilized to better understand topics and issues that are currently impacting citizens and are deemed to be the most important to the citizens. However, it represents such a vast amount of data that conventional computing devices and systems have been unable to efficiently and easily harness the information in the data.

The system discussed herein applies over twenty years of research in the behavioral sciences that has demonstrated that when standard measures of prosperity such as gross domestic product (GDP), unemployment, and crime rates are combined with direct measurement of citizen wellbeing (e.g., subjective wellbeing), decision makers may have deeper insight into the needs of their citizens and the impact of city programs, enabling the decision makers and cities to better design and assess public policy.

The system discussed herein takes a multidimensional approach to the quantitative measurement of subjective wellbeing, establishing a consistent, scientific measure of how people feel about their quality of life in their city and surrounding area. Quantifying the measurement of subjective wellbeing enables identification and monitoring of how a population perceives their quality of life, in near-realtime. Quantification of subjective wellbeing also enables an important aspect of understanding total quality of life that has previously only been assessed in qualitative terms, to now be measured in a way that is more consistent with how we measure other quality of life indicators such as employment and crime. The system may utilize big data, computing devices, and statistics to better understand the relationship between how people feel about their quality of life (subjective wellbeing) and how that feeling manifests in or impacts real world outcomes.

The six dimensions associated with subjective wellbeing discussed herein include Affect, Relationships, Focus, Purpose, Fulfillment, and Personal Health. Other dimensions are possible. The Affect dimension may measure the expression of general feelings of happiness/unhappiness. The Relationships dimension may measure the expression of feelings related to interpersonal relationships. The Focus dimension may measure the expression of feelings related to the ability or opportunity (or lack of to immerse/wholly invest oneself in something of interest, and the presence of one's life of ideas or pursuits (e.g., work, hobbies) that invite or discourage that immersion. The Purpose dimension may measure the expression of feelings related to a sense of purpose (or lack of) in/to life or what may be perceived as giving one's life purpose (family, friends, work, interests, personal, or spiritual beliefs). The Fulfillment dimension may measure the expression of feelings related to a sense of (or lack of) accomplishment or life satisfaction. The Personal Health dimension may measure the expression of feelings related to physical and mental health.

For example, the system discussed herein has been used to determine in cities in the United States and throughout the world that an Affect score is a leading indicator of economic growth as measured by value of new housing construction. For every point of increase in Affect, the system has identified a consistent increase in the value of new housing permits two months later. In addition, the system has been used to determine in cities in Australia that overall subjective wellbeing is a leading indicator of economic improvement. Each point of increase in overall subjective wellbeing forecasts a 1% decrease in unemployment one to two months later. The system utilizes an algorithm discussed herein that provides native language analysis in English and other languages such as Spanish. The system may utilize the algorithm discussed herein and specialized analytic models to analyze quantitative measures, to identify and understand the underlying emotional and thematic drivers influencing how citizens perceive their lives and their own wellbeing in their city or location.

The approach to subjective wellbeing measurement may include determining a weekly score across six dimensions of subjective wellbeing including Affect, Relationships, Focus, Purpose, Fulfillment, and Personal Health, aggregated into an overall weekly subjective wellbeing score. Using data science techniques, the system may identify the key topics and issues driving the measures for each dimension of subjective wellbeing. This may enable policy makers to discover which topics or issues may be contributing and/or detracting from how citizens feel about their quality of life (e.g., subjective wellbeing), as well as to understand which issues are most important to their citizens in the context of their wellbeing, and which issues are most impactful to their wellbeing, based on how those issues affect the subjective wellbeing score.

The score may serve as a barometer for how people feel about their quality of life in a particular location such as a city. This enables the identification of trends and monitoring of changes over time, which can be used as an overall indicator of progress (or problems, depending on the direction of the changes in the score), as well as serve as a type of key performance indicator (KPI) or measure of evaluation (MOE) for city programs, based on the impact they have on the subjective wellbeing score. Quantifying subjective wellbeing also enables its use with traditional quality of life measures which are also quantitative: economic indicators, crime statistics, health statistics, etc. Conventionally, it is difficult to examine the relationship between how people feel about their quality of life and how that manifests in their behaviors out in the world (e.g., economy, crime, household, illness, longevity). Quantification of subjective wellbeing makes this possible and solves many problems.

According to an example, the system may collect at least one document from at least one document source. The at least one document may be associated with a particular geographic location and may have a timestamp or date that is associated with a particular period of time, e.g., a particular week. The at least one document may be placed into a queue for processing and stored in a database. The at least one document may be stored in an associated data lake and assigned an index.

Next, the system may perform processing on data associated with the at least one document using one or more loaders. This may include language translation, character set processing, pornographic material detection, entity extraction, author extraction, similar document determination, comment toning, location tagging, topic tagging, word count determination, risk factor processing, and others.

The system may perform natural language processing on the at least one document and assign the at least one document to at least one subjective wellbeing dimension. The at least one document may be assigned to the at least one subjective wellbeing dimension using a subjective wellbeing analytics filter that includes a Boolean bag of words for each subjective wellbeing dimension. The words found in the at least one document may be compared with each filter for each dimension to determine whether the dimension is associated with or applicable to the document. In addition, for each applicable dimension, the document may be determined to be one of negative, positive, or neutral.

The system may insert the at least one document into a bin associated with each applicable subjective wellbeing dimension. Each bin may include a plurality of documents that are associated with a particular dimension and may be associated with the particular geographic location for the particular period of time.

Then, the system may analyze each document in each bin associated with each subjective wellbeing dimension to determine a score for each of the six subjective wellbeing dimensions and an overall score that is based on each of the subjective wellbeing dimensions. After determining the binned scores and the overall score, the system may determine a smoothed dimension score for each of the dimensions during the particular period of time.

Booleans were developed to identify positive and negative factors of the six dimensions of subjective wellbeing. Each of the six dimensions, Affect, Relationships, Focus, Purpose, Fulfillment, and Personal Health, have an associated bag of words in at least one language, e.g., English or Spanish. When a document is received by the system, it may be compared with the bag of words for each dimension to determine one or more related subjective wellbeing dimensions for the document. As an example, Affect may have a bag of words or an array of words for Positive Affect and a bag of words or an array of words for Negative Affect. Focus may have a bag of words or an array of words for Focus and a bag of words or an array of words for Lack of Focus. Relationships may have a bag of words or an array of words for Positive Relationships and a bag of words or an array of words for Negative Relationships. Purpose may have a bag of words or an array of words for Purpose and a bag of words or an array of words for Lack of Purpose. Fulfillment may have a bag of words or an array of words for Fulfillment and a bag of words or an array of words for Lack of Fulfillment. Personal Health may have a bag of words or an array of words for Positive Health and a bag of words or an array of words for Negative Health. In addition, the bags of words or arrays of words may be supplemented with slang that may be regional slang such as slang words used in Australia or slang words used in a particular region of the United States such as slang words primarily used in the Midwest.

A collection of all documents which are associated with any of the Booleans is known as a corpus. For each document in the corpus, the system may perform natural language processing to determine an overall document sentiment. A directed sentiment may be determined based on whether the document is identified as a positive or negative version of an underlying subjective wellbeing dimension.

| Direction of Subjective Wellbeing | Overall Document Sentiment | Directed Sentiment |
|---|---|---|
| Positive or Negative | Positive | +1.0 |
| Positive or Negative | Negative | −1.0 |
| Positive | Neutral | +0.5 |
| Negative | Neutral | −0.5 |

In addition, for each document, an overall risk of the document may be determined. The overall risk of the document may be determined based on the methods discussed in U.S. application Ser. No. 14/019,239, filed Sep. 5, 2013, and entitled "Methods and Systems for Determining a Risk of an Emotional Response of an Audience," the entire contents of which is incorporated herein by reference. The overall risk may be based on a scale from zero to one hundred. A directed risk may then be determined based on the following table.

| Overall Risk (x) | Directed Risk |
|---|---|
| x < 0.037 | 0.5 |
| 0.037 <= x < 0.70 | 0.6 |
| 0.70 <= x < 1.54 | 0.7 |
| 1.54 <= x < 2.57 | 0.8 |
| 2.57 <= x < 5.89 | 0.9 |
| x > 5.89 | 1.0 |

Next, a directed raw score may be determined based on a product of the directed sentiment and the directed risk of the document. Once the directed raw scores are determined for the at least one document, the system may determine an average within a city or a particular geographic location either by week or month, or another particular period of time depending on a volume of the at least one document. This may be known as a Binned Raw Score. The averages may be determined by binning the dimensions of the subjective wellbeing, e.g., combining the positive and negative documents determined to be associated with each dimension. Then, for all cities and time frames in consideration, the system may determine mean and standard deviation of the binned raw scores.

| Dimension (d) | Mean ($\mu_d$) | Standard Deviation ($\sigma_d$) |
|---|---|---|
| Affect | 0.152132 | 0.078204 |
| Focus | −0.22691 | 0.034006 |
| Relationships | 0.136919 | 0.044928 |
| Purpose | 0.023924 | 0.046834 |
| Fulfillment | 0.058879 | 0.056286 |
| Personal Health | −0.06835 | 0.061715 |

The mean and standard deviation values in the table above are based on an original study of the six largest cities in the United States, which are now used to generate new scores for other cities in the United States and the world.

Then the system may determine a binned dimension score for each time period (e.g., week or month), city, and binned dimension by determining:

$$DS(\text{dim}, \text{city}, \text{time}) = 100 \ \Phi\left(\frac{x - \mu_d}{\sigma_d}\right)$$

Where $\Phi$ is the cumulative distribution function for the standard normal, x is the Binned Raw Score computed for a new city and time period for an existing dimension, and $\mu_d$ and $\sigma_d$ are taken from the table shown above associated with dimension.

After determining the binned dimension score for each dimension, the system may then determine a smoothed version of the dimension scores with an exponentially weighted moving average using a window size of eight.

When considering the impact of topics on the subjective wellbeing, the system may determine an analysis of an impact of a particular topic. The topic may be a Boolean topic (e.g., a particular event in a city) or a topic determined through topic modeling. For a particular topic, the system may identify all documents that have a common topic. This may produce a set of smoothed dimension scores that correspond to the subjective wellbeing dimensions if the topic did not exist. As a result, the system may determine that a particular topic has a particular increase in a particular dimension (e.g., a three point increase).

As an example, a document may be a social media post such as a tweet associated with the social media platform TWITTER. The document may include the following text: "On 2018-05-05 13:25:30, John Smith in St. Louis, Mo. tweeted: "@CubsFan43@JRBlenks I honestly don't care that much. Here's the thing: as uptight and blah blah blah people say Cardinals fans are, it is just easy to work up a large portion of the cubs fan base. This is exhibit A."

This document may be received by the system as part of a stream from a social media provider. The stream may be geographically defined based on specific geographic boundaries. In one example, the stream may include documents based on a geofence that includes geographical boundaries such as a geofence that includes the Chicagoland area or the Washington D.C. metropolitan area. As documents are received by the system, they may be processed.

As an example, the document may be processed by the server computing device within seconds of when it is posted and placed into a message queue to be stored in a database associated with the server computing device. In one example, the document, or tweet in this case, may be picked up off the message queue and stored in a data lake associated with the database. In addition, the document may be added to an index. The index may allow for rapid scanning and searching of the data lake. The document may be assigned to a job to be processed and transformed by one or more loaders.

The one or more loaders may assign one or more scores to the document. As an example, the document may be assigned an overall document sentiment that may be determined to be neutral. The document may be processed to determine one or more subjective wellbeing dimensions and tagged with one or more directional (e.g., positive or negative) subjective wellbeing dimensions including Affect, Relationships, Focus, Purpose, Fulfillment, and Personal Health. As an example, this document may be tagged with a lack of Focus and a lack of Purpose based on terms appearing in the document that may be found in two of the twelve subjective wellbeing dimension Boolean bags of words.

Affect may have a negative bag of words and a positive bag of words. Relationships may have a negative bag of words and a positive bag of words. Focus may have a negative bag of words and a positive bag of words. Purpose may have a negative bag of words and a positive bag of words. Fulfillment may have a negative bag of words and a positive bag of words. Personal Health may have a negative bag of words and a positive bag of words. The words in the document may be compared with the bag of words of each of the twelve subjective wellbeing dimension Boolean bags of words.

Because the direction of the subjective wellbeing for both dimensions is negative but the overall document sentiment is neutral, the directed sentiment for the document is scored as −0.5 for both of the subjective wellbeing dimensions. An overall risk score for the document may be determined to be 2.8523. As a result, the directed risk for the document may be 0.9 Using the directed sentiment score for the document (−0.5) and the directed risk score of 0.9, the document's directed raw score for subjective wellbeing may be determined to be the product of its direct sentiment score and directed risk score. Thus, the directed raw score for the document is determined to be −0.45 for both of the subjective wellbeing dimensions Focus and Purpose.

This document originated in St. Louis, Mo. and may be associated with a St. Louis corpus of documents. The scored document may be combined with other scored documents that originated in St. Louis during the week of Apr. 29, 2018 to May 5, 2018 to determine a binned raw score for that week in St. Louis for each of the six subjective wellbeing dimensions and for the overall subjective wellbeing. The document may factor into the binned raw scores for the Focus and Purpose dimensions for this week based on the subjective wellbeing dimension tagging assigned during subjective wellbeing filtering as well as into the binned raw score for overall subjective wellbeing. The binned dimension scores for the week may be determined and may be used to determine a smoothed dimension score for each of the dimensions during the analysis period.

Latent Dirichlet allocation (LDA) processing may be executed on the St. Louis corpus for a twelve month analysis period of interest that may include the week of Apr. 29, 2018 to May 5, 2018. LDA processing is a type of topic modeling, where the frequency and connections between individual words creates groups of documents ("discovered topics"). A human user may then examine each group and connect each group with a simple phrase which describes the content and connection of those documents. In the current example, this document was binned into a discovered LDA common topic on sports and community, which was known as "local sports and community events." LDA processing and topic modeling is further discussed in U.S. Pat. No. 9,298,814 entitled "Systems and Methods for Classifying Electronic Documents," filed Mar. 15, 2013, the entire contents of which is incorporated by reference herein. Next, the topic may be scored for sentiment and overall risk using the scores of all the documents included in this LDA topic group. In addition, this topic may be scored for importance based on U.S. Pat. No. 9,710,550 entitled "Systems and Methods for Identifying Issues in Electronic Documents," filed Sep. 4, 2014, the entire contents of which is incorporated herein by reference. In addition, the system may determine the impact of the topic on the subjective wellbeing dimension scores.

The document also may be a factor associated with the scoring of the Boolean topic "St. Louis Cardinals," where it factors into the measure of the St. Louis Cardinals on subjective wellbeing in St. Louis.

The system may include a memory having instructions stored thereon and at least one processor to execute the instructions to collect at least one document from at least one document source, the at least one document associated with a particular geographic location and a particular period of time, insert the at least one document into a queue for processing, store the at least one document in a data lake, and assign the at least one document an index, perform natural language processing on the at least one document to obtain text from the at least one document and assign the at least one document to at least one subjective wellbeing dimension by comparing the text from the at least one document with a subjective wellbeing dimension filter for each subjective wellbeing dimension, insert the at least one document into at least one bin, each bin associated with a particular subjective wellbeing dimension, and analyze each document in each bin associated with the particular subjective wellbeing dimension to determine a score for each subjective wellbeing dimension and an overall score that is based on each score for each subjective wellbeing dimension.

FIG. 1 shows a block diagram of a computing system comprising a subjective wellbeing analytics system 100 according to an example embodiment. The subjective wellbeing analytics system 100 includes a subjective wellbeing server computing device 102 that may be in communication with at least one client computing device 104 via a communication network 110. The subjective wellbeing server computing device 102 may be in communication with a relational database management system (RDBMS) or another type of database management system that stores and communicates data from at least one database 106.

The at least one database 106 may be a structured query language (SQL) database such as a MySQL database, a NoSQL database, or a MongoDB database, among others. The at least one database 106 may be integrated with the subjective wellbeing server computing device 102 or in communication with the subjective wellbeing server computing device 102. In addition, the at least one database 106 may include one or more data lakes such as a Bigtable data lake. The one or more data lakes may have an associated data lake index.

The at least one client computing device 104 is configured to receive data from and/or transmit data to the subjective wellbeing server computing device 102 through the communication network 110. Although the subjective wellbeing server computing device 102 is shown as a single server it is contemplated that the subjective wellbeing server computing device 102 may include multiple servers such as in a cloud computing configuration.

The at least one client computing device 104 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a browser application that may display a user interface provided by a subjective wellbeing analytics application 108 executed by the subjective wellbeing server computing device 102. In addition, the at least one client computing device 104 further includes at least one communications interface to transmit and receive communications, messages, and/or signals.

The at least one client computing device 104 can be a laptop computer, a smartphone, a personal digital assistant, a tablet computer, a standard personal computer, or another processing device. The at least one client computing device 104 may include a display, such as a computer monitor, for displaying data and/or graphical user interfaces. The at least one client computing device 104 may also include an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer. In addition, the at least one client computing device 104 further includes at least one communications interface to transmit and receive communications, messages, and/or signals.

The at least one client computing device 104 may display on the display a graphical user interface (GUI). The graphical user interface may be provided by the subjective wellbeing application 108 and displayed by a browser on the display. The graphical user interface enables a user of the at least one client computing device 104 to interact with the subjective wellbeing analytics application 108.

The at least one subjective wellbeing server computing device 102 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the subjective wellbeing application 108.

The communication network 110 can be the Internet, an intranet, or another wired or wireless communication network. For example, the communication network 106 may include a Mobile Communications (GSM) network, a code division multiple access (CDMA) network, $3^{rd}$ Generation Partnership Project (GPP) network, an Internet Protocol (IP) network, a wireless application protocol (WAP) network, a WiFi network, a Bluetooth network, a satellite communications network, or an IEEE 802.11 standards network, as well as various communications thereof. Other conventional and/or later developed wired and wireless networks may also be used.

The subjective wellbeing analytics application 108 may be a component of an application and/or service executable by the at least one subjective wellbeing server computing device 102 and/or the at least one client computing device 104. For example, the subjective wellbeing analytics application 108 may be a single unit of deployable executable code or a plurality of units of deployable executable code. According to one aspect, the subjective wellbeing analytics application 108 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

Figure 2:
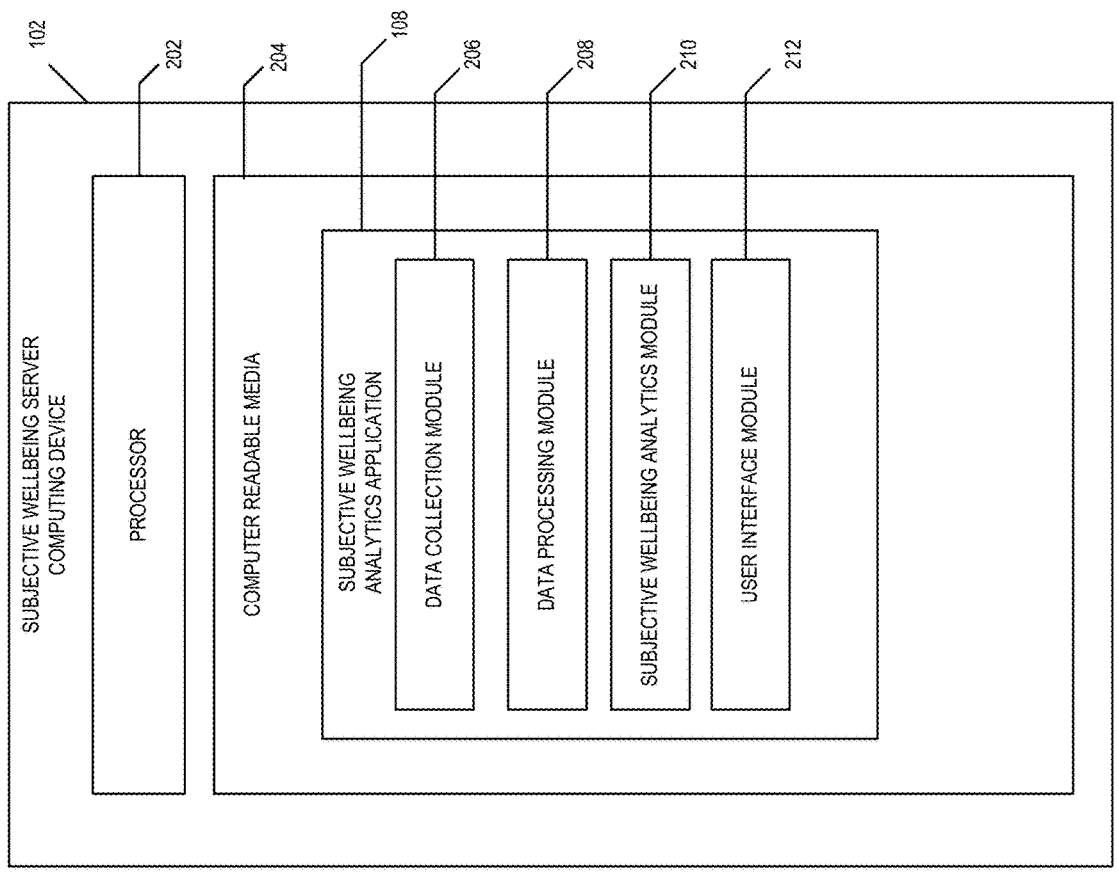
FIG. 2 shows a block diagram of a server computing device of the system according to an example embodiment.

FIG. 2 illustrates a block diagram of the subjective wellbeing server computing device 102 according to an example embodiment. The subjective wellbeing server computing device 102 includes at least one processor 202 and computer readable media (CRM) 204 in memory on which the subjective wellbeing analytics application 108 or other user interface or application is stored. The computer readable media 204 may include volatile media, nonvolatile media, removable media, non-removable media, and/or another available medium that can be accessed by the processor. By way of example and not limitation, the computer readable media 204 comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The subjective wellbeing analytics application 108 includes a data collection module 206 for obtaining at least one document from at least one data source. As an example, data sources may include streams associated with social media platforms or providers including FACEBOOK, TWITTER, INSTAGRAM, YOUTUBE, and other social media sources. In addition, data sources may include message boards, blogs, forums, news sites, review sites, Scopus, web feeds such as RSS feeds, Critical Mention, and other data sources. The data collection module 206 may obtain and store a vast number of documents and information associated with the documents.

The streams may be provided by a source such as the TWITTER Decahose that may have an associated web application programming interface (API). The TWITTER Decahose includes a ten percent random sample of the realtime TWITTER firehose of tweets. In addition, the streams may be provided by the TWITTER PowerTrack. PowerTrack provides full access to the realtime TWITTER firehose of tweets. In one example, the data collection module 206 may send authentication information to a server computing device and connect with the server computing device to receive data from the source in realtime. As an example, the data collection module may connect with the stream via a URL such as https://gnip-stream.twitter.com/stream/sample10/accounts/:account_name/publishers/twitter/:stream_label.js on?partition=1.

The data collection module 206 may receive the at least one document and place the at least one document in a queue such as a RabbitMQ message queue for storage and processing. Each document in the queue may be stored in the at least one database 106 and given an index. The at least one database may be a data lake.

The subjective wellbeing analytics application 108 includes a data processing module 208 for receiving the at least one document from the at least one data source as obtained by the data collection module 206 and processing and transforming the at least one document for use by the subjective wellbeing application 108. As an example, the data processing module 208 may perform a variety of processing on the at least one document using one or more loaders.

The one or more loaders may include a language detection loader that determines a language of text in the document. A language with a highest probability score is determined to be the language of the text, e.g., English or Spanish. The one or more loaders also may include a language translation loader. The language text may be passed to the language translation loader that receives the text and returns an English translation of the text. However, if the text is determined to be English, the language translation loader does not perform the language translation.

The one or more loaders may include a character set processing loader that ensures that the text in the document is in the UTF8 character set. The one or more loaders also may include a spam detection loader that executes a set of grammar rules to determine if the text in the document is grammatically correct. The one or more loaders also may include a pornographic detection loader. The pornographic detection loader may use a predetermined library of terms to process the text and generate a cumulative score that indicates a level of adult content determined to be in the text. The score, e.g., one-hundred and twelve, may be compared with four different threshold values (e.g., one hundred, two hundred, three hundred, and four hundred) to determine a severity of adult content in the text. Any document having a score above four hundred is not processed beyond this point by any of the other loaders or the subjective wellbeing analytics module 210.

The one or more loaders may further include an entity extraction loader that may determine an overall document sentiment, people, organizations, and brands having the associated sentiment, geographical locations associated with the document, and a relevance of entities in the document. The one or more loaders may further include an author extraction loader that may determine an author of the document. As an example, the document may have a byline and the author extraction loader may parse the document for the byline.

The one or more loaders may include a similar article detection loader that may calculate a Rabin fingerprint of the document. In one example, the similar article detection loader may generate six Rabin fingerprints of the document and may compare the fingerprints of the document against fingerprints of other documents processed by the system 100 from a previous time period such as a number of days, e.g., five. If a particular number of fingerprints match the instant fingerprint, e.g. four or more, then the document may be determined to be similar to another document. The document may be flagged as an echo document.

The one or more loaders may include a comment toning loader that may process one or more comments associated with the document (e.g., a comment associated with a blog post) and determine an overall sentiment of the comment. The one or more loaders may include a place tagging loader that may associate a particular location with the document based on a location of publication of the document, location data associated with the document (e.g., a tweet having metadata such as a latitude/longitude), and a location extracted from the document.

The one or more loaders may include a topic and theme tagging loader that may match text associated with the document against a user entered search string. For example, the string: "@STLCardinals" OR "#stlcardinals" OR "stlcardinals" OR "STLcards" OR "@stlcards" OR "#stlcards" OR "Stl cardinals" OR "st. louis cardinals" OR "Cardinals" OR "#Cardinals" OR "@Cardinals" OR "birds on bat"~5 OR "Stl cardinal"~15 OR "Cardinalway" OR "#cardinalway" OR "@cardinalway" may be used to identify conversations about the St. Louis Cardinals. In this search language, "x y"~5 means a proximity search—the words "X" and "Y" must occur within a 5-word window. The loaders identify the presence of these search strings when the document is loaded and then it is "tagged" into the database 106 as mentioning the topic. The one or more loaders may include an issue tone processing loader that may determine which sections or sentences in the document are associated with a particular topic. Each section or sentence may be processed using sentiment processing.

The one or more loaders may further include a word count processing loader that may determine a number of words in text of the document. The one or more loaders may include a risk factor loader that may compare the text in the document with nineteen predetermined risk types. For each of the nineteen predetermined risk types, there is a set of words. The risk factor loader may compare the text in the document with the set of words for each risk type and extract a frequency of words in the text of the document. The risk factor loader may perform a Pearson correlation between the risk factor data and the text of the document to determine a value that is determined as a risk factor for the document.

The one or more loaders may include a document reputation loader. Document reputation may be based on awareness and document tone. Awareness may be based on a publication score and an associated page that the document appears on in a publication. Publication score may be based on credibility and circulation. Publication credibility may be based on user entered data. A publication may be given a score between low (e.g., one) and high (e.g., five) for one or more locations and one or more target audiences. If the publication does not have score data, then it may have a value of zero.

Publication circulation may be one of three values including low (e.g., one), medium (e.g., two), and high (e.g., three). Awareness may be publication credibility plus publication circulation multiplied by a page number factor. A page number factor may be high (three) if the page is the first page and low (e.g., one) if the page number is not the first page or no page number is provided. A document tone may be adjusted to be 0.4 for a positive tone, 0.1 for a neutral tone, and −0.8 for a negative tone. The overall document reputation may be the adjusted tone multiplied by the sum of the awareness and a relevance factor having a constant value of 2.4.

The one or more loaders may include an entity reputation loader that may determine a reputation of an entity associated with the document. Entity reputation may be based on awareness and document tone. Awareness may be based on a publication score and an associated page that the entity mention appears on in a publication. Publication score may be based on credibility and circulation. Publication credibility may be based on user entered data. A publication may be given a score between low (e.g., one) and high (e.g., five) for one or more locations and one or more target audiences. If the publication does not have score data, then it may have a value of zero. Publication circulation may be one of three values including low (e.g., one), medium (e.g., two), and high (e.g., three). Awareness may be publication credibility plus publication circulation multiplied by a page number factor. A page number factor may be high (three) if the entity mention occurs on the first page and low (e.g., one) if the entity mention occurs on a page other than the first page, or no page number is provided. An entity tone may be adjusted to be 0.4 for a positive tone, 0.1 for a neutral tone, and −0.8 for a negative tone. The overall entity reputation may be the adjusted tone multiplied by the sum of the awareness and a relevance factor having a constant value of 2.4.

The subjective wellbeing analytics application 108 may include a subjective wellbeing analytics module 210 for generating a subjective wellbeing analytics score for a period of time (e.g., a week) for a particular location such as a city or metropolitan area (e.g., Chicago) based on a plurality of documents determined to be associated with the city or metropolitan area. In one example, the subjective wellbeing analytics module may generate the subjective wellbeing analytics score based on the plurality of documents in one or more dimensions including Affect, Relationships, Focus, Purpose, Fulfillment, and Personal Health. The city may receive an overall subjective wellbeing analytics score ranging from zero to one hundred for a particular period of time, e.g., a particular week, an Affect score ranging from zero to one hundred for the particular period of time, a Relationships score ranging from zero to one hundred for the particular period of time, a Focus score ranging from zero to one hundred for the particular period of time, a Purpose score ranging from zero to one hundred for the particular period of time, a Fulfillment score ranging from zero to one hundred for the particular period of time, and a Personal Health score ranging from zero to one hundred for the particular period of time. The overall subjective wellbeing analytics score may be based on the score for the particular period of time in each of the dimensions.

As noted above, the subjective wellbeing analytics module 210 may continually receive one or more documents from streams of data or other sources that are processed by the data processing module 208 and perform wellbeing filtering on the one or more documents to determine if each document is related to one or more of the subjective wellbeing dimensions. First, for each document, the subjective wellbeing analytics module 210 may determine an overall document sentiment for the document. The subjective wellbeing analytics module 210 may determine one or more related subjective wellbeing dimensions by performing natural language processing on the text of the document and comparing text of the document with each bag of words associated with each subjective wellbeing dimension including Affect (positive/negative), Relationships (positive/negative), Focus (positive/negative), Purpose (positive/negative), Fulfillment (positive/negative), and Personal Health (positive/negative) to perform subjective wellbeing filtering. For each subjective wellbeing dimension, it is determined whether the document is associated with the wellbeing dimension and an associated direction (positive/negative)

based on the bag of words. A directed sentiment value may be assigned based on the values as shown in the following table.

| Direction of Subjective Wellbeing | Overall Document Sentiment | Directed Sentiment |
| --- | --- | --- |
| Positive or Negative | Positive | +1.0 |
| Positive or Negative | Negative | −1.0 |
| Positive | Neutral | +0.5 |
| Negative | Neutral | −0.5 |

Each document may be placed in one or more collections or bins of documents based on subjective wellbeing dimension for the particular city. Documents that receive a positive or negative score in a particular wellbeing dimension are binned together. In other words, the subjective wellbeing analytics module 210 bins positive and negative documents related to Affect in an Affect bin, bins positive and negative documents related to Relationships in a Relationships bin, bins positive and negative documents related to Focus in a Focus bin, bins positive and negative documents related to Purpose in a Purpose bin, bins positive and negative documents related to Fulfillment in a Fulfillment bin, and bins positive and negative documents related to Personal Health in a Personal Health bin. Each document may be binned in zero or more of the bins.

Next, the subjective wellbeing analytics module 210 may determine an overall risk of each document. The overall risk of each document may be determined based on the methods discussed in U.S. application Ser. No. 14/019,239. After determining the overall risk, a directed risk may be computed using the following table:

| Overall Risk (x) | Directed Risk |
| --- | --- |
| x < 0.037 | 0.5 |
| 0.037 <= x < 0.70 | 0.6 |
| 0.70 <= x < 1.54 | 0.7 |
| 1.54 <= x < 2.57 | 0.8 |
| 2.57 <= x < 5.89 | 0.9 |
| x > 5.89 | 1.0 |

Next, a directed raw score may be determined based on a product of the directed sentiment and the directed risk. Once the directed raw scores are determined for the at least one document, based on a volume or number of the documents, an average may be determined using the bins associated with each dimension of subjective wellbeing. For all cities and time frames, the subjective wellbeing analytics module 210 may determine a mean and standard deviation of the binned raw scores. The mean and standard deviation values in the table below are based on an original study of the six largest cities in the United States, which are now used to generate new scores for other cities in the United States and the world.

| Dimension (d) | Mean ($\mu_d$) | Standard Deviation ($\sigma_d$) |
| --- | --- | --- |
| Affect | 0.152132 | 0.078204 |
| Focus | −0.22691 | 0.034006 |
| Relationships | 0.136919 | 0.044928 |
| Purpose | 0.023924 | 0.046834 |
| Fulfillment | 0.058879 | 0.056286 |
| Personal Health | −0.06835 | 0.061715 |

After this, the subjective wellbeing analytics module 210 may utilize the following equation to determine a score that ranges from zero to one hundred for each dimension, city, and period of time. The score is determined based on the one or more documents that are in each of the bins. Each bin and associated subjective wellbeing dimension is assigned a score based on the one or more documents.

$$DS(\text{dim}, \text{city}, \text{time}) = 100 \; \Phi\!\left(\frac{x - \mu_d}{\sigma_d}\right)$$

Where $\Phi$ is the cumulative distribution function for the standard normal, x is the Binned Raw Score computed for a new city and time period for an existing dimension, and $\mu_d$ and $\sigma_d$ are taken from the table shown above associated with dimension.

The subjective wellbeing analytics module 210 then determines smoothed versions of the Dimension Scores (Smoothed Dimension Scores, SDS), with an Exponentially Weighted Moving Average, using a window size of eight (for either weekly or monthly resolution, where all values are returned but the preliminary values—the first seven values—are smoothed to a lesser extent than later values). In other words, the first seven of the binned dimension scores may be lost to create a first smoothed dimension score using an exponentially weighted moving average. Then, the next eight binned dimension scores may be used to create a second smoothed dimension score, and so on. The above equation provides information about how much a given score deviates from the overall mean for that dimension. This can be used to identify particular dimensions, cities, and time periods which are substantially greater or less than average based on the standard deviation of that dimension, converting that number to a probability, and then finally converting the probability to 0-100 score. For example, the Binned Raw Score for St. Louis for Fulfillment for the week from Apr. 29, 2018 to May 5, 2018 is 0.1179. According to the table, $\mu_d$ for this dimension is 0.058879 and $\sigma_d$ is 0.056286. The subjective wellbeing analytics module 210 may compute (0.1179-0.058870)/0.056286. The value is 1.0487510. This indicates that the Fulfillment score in St. Louis for this week is 1.0487510 standard deviations above the overall average across all cities. Using the standard mathematical calculation for cumulative distribution functions for standard normal, $\Phi$ (1.0487510)=0.8528536. This probability means that the score is expected to be less than this value 85.28536% of the time. By multiplying by 100, the subjective wellbeing analytics module 210 determines a final score of DS (Fulfillment, St. Louis, 2018 Apr. 29)=85.28536

The subjective wellbeing analytics application 108 includes a user interface module 212 for transmitting a user interface to the client computing device 104 to be displayed on the display. As an example, the user interface module 212 generates a native and/or web-based graphical user interface (GUI) that accepts input and provides output viewed by users of the client computing device 104. The client computing device 104 may provide realtime automatically and dynamically refreshed information such as data and data values from the database 106. The user interface module 212 may send data to other modules of the subjective wellbeing analytics application 108 of the subjective wellbeing server computing device 102, and retrieve data from other modules of the subjective wellbeing analytics application 108 of the subjective wellbeing server computing device 102 asynchronously without interfering with the display and behavior of the user interface displayed by the client computing device 104.

Figure 3:
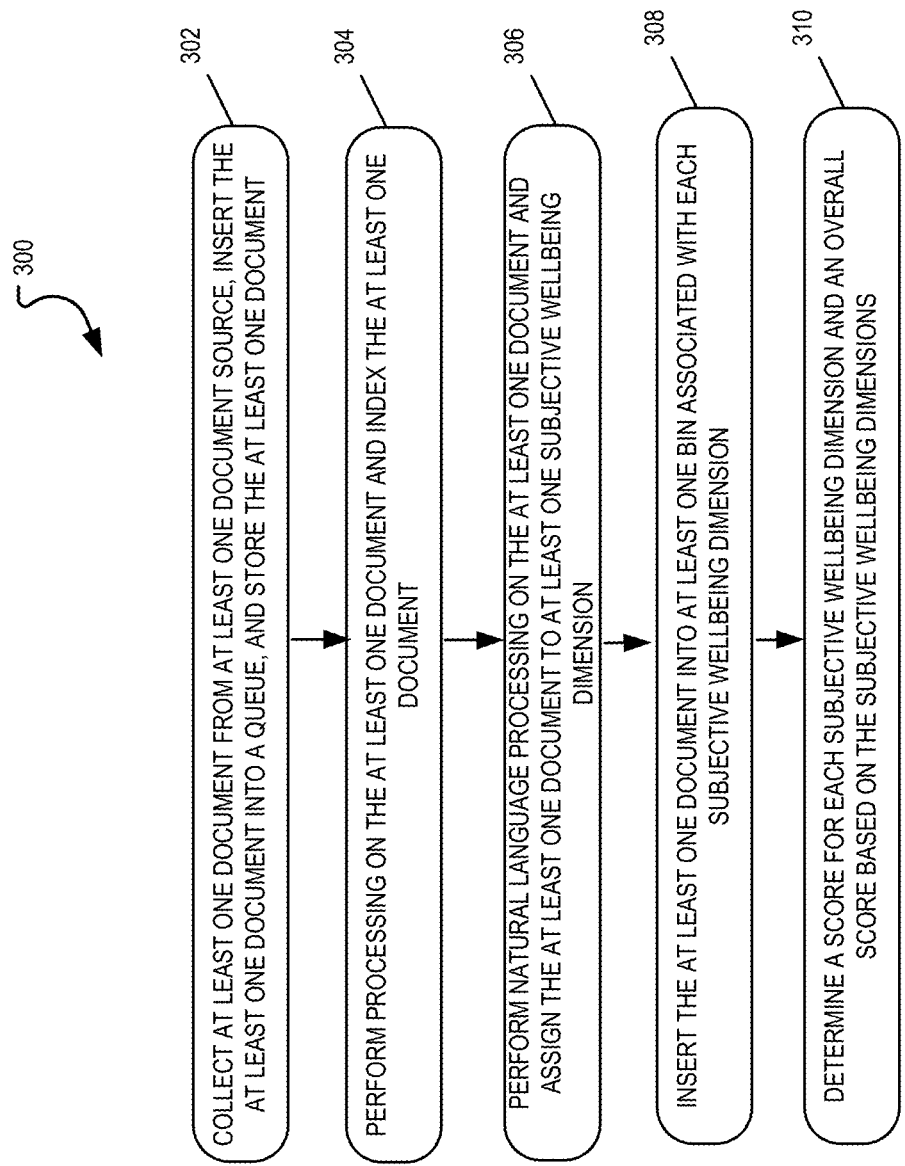
FIG. 3 illustrates a flowchart for generating a subjective wellbeing analytics score according to an example embodiment.

FIG. 3 illustrates a flowchart of a process 300 for generating a subjective wellbeing analytics score according to an example embodiment. In a first step 302, the subjective wellbeing analytics application 108 of the subjective wellbeing server computing device 102 may collect at least one document from at least one document source such as one or more streams.

The at least one document may be associated with a particular geographic location and may have a timestamp or date that is associated with a particular period of time, e.g., a particular week. The at least one document may be placed into a queue for processing and stored in the database 106. The at least one document may be stored in an associated data lake and assigned an index.

Next, in step 304, the subjective wellbeing analytics application 108 of the subjective wellbeing server computing device 102 may perform processing on data associated with the at least one document using one or more loaders. The processing may include language translation, character set processing, pornographic material detection, entity extraction, author extraction, similar document determination, comment toning, location tagging, topic tagging, word count determination, risk factor processing, and others.

In step 306, the subjective wellbeing analytics application 108 of the subjective wellbeing server computing device 102 may perform natural language processing on the at least one document and assign the at least one document to at least one subjective wellbeing dimension. The at least one document may be assigned to the at least one subjective wellbeing dimension using a subjective wellbeing analytics filter that includes a Boolean bag of words for each subjective wellbeing dimension and a direction associated with each dimension (e.g., positive/negative). The words found in the at least one document may be compared with each filter for each dimension to determine whether the dimension is associated with or applicable to the document. In addition, for each applicable dimension, the document may be determined to be one of negative, positive, or neutral.

In step 308, the subjective wellbeing analytics application 108 of the subjective wellbeing server computing device 102 may insert the at least one document into a bin associated with each applicable subjective wellbeing dimension. Each bin may include a plurality of documents that are associated with a particular dimension and may be associated with the particular geographic location for the particular period of time.

Next, in step 310, the subjective wellbeing analytics application 108 of the subjective wellbeing server computing device 102 may analyze each document in each bin associated with each subjective wellbeing dimension to determine a score for each of the six subjective wellbeing dimensions and an overall score that is based on each of the subjective wellbeing dimensions. As an example, the score for each of the subjective wellbeing dimensions may be based on the following:

$$DS(\text{dim, city, time}) = 100 \ \Phi\left(\frac{x - \mu_d}{\sigma_d}\right)$$

Where $\Phi$ is the cumulative distribution function for the standard normal, x is the Binned Raw Score computed for a new city and time period for an existing dimension, and $\mu_d$ and $\sigma_d$ are taken from the table shown herein associated with dimension.

After determining the binned scores and the overall score, the subjective wellbeing analytics application 108 may determine a smoothed dimension score for each of the dimensions during the particular period of time.

In another example, LDA may be executed on a corpus of documents over a period of time, e.g., twelve months that may include the particular period of time. The at least one document may be included as part of a discovered LDA topic such as local sports and community events. The topic may be scored for sentiment and overall risk. In addition, the topic may be scored for importance. Additionally, the impact of the topic may be determined on each of the subjective wellbeing dimension scores for the particular period of time.

Figure 4:
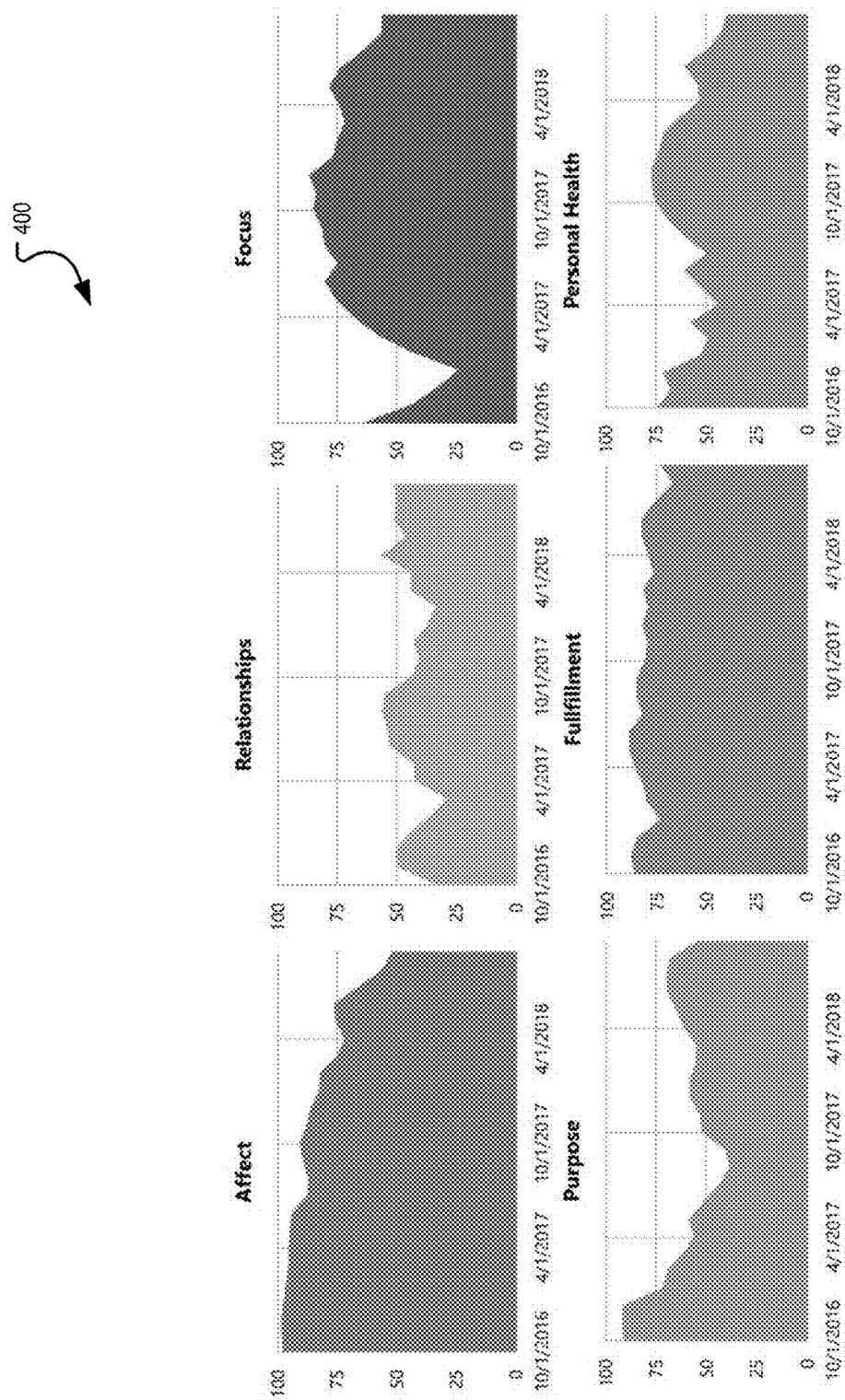
FIG. 4 illustrates example graphs provided by the server computing device of the system according to an example embodiment.

FIG. 4 shows an example set of graphs 400 of each of the six dimensions Affect, Relationships, Focus, Purpose, Fulfillment, and Personal Health in a particular city from Oct. 1, 2016 to the middle of 2018. As shown in each graph, each of the six dimensions have a score that ranges from zero to one hundred that may vary over time based on the documents received and processed by the system 100.

Figure 5:
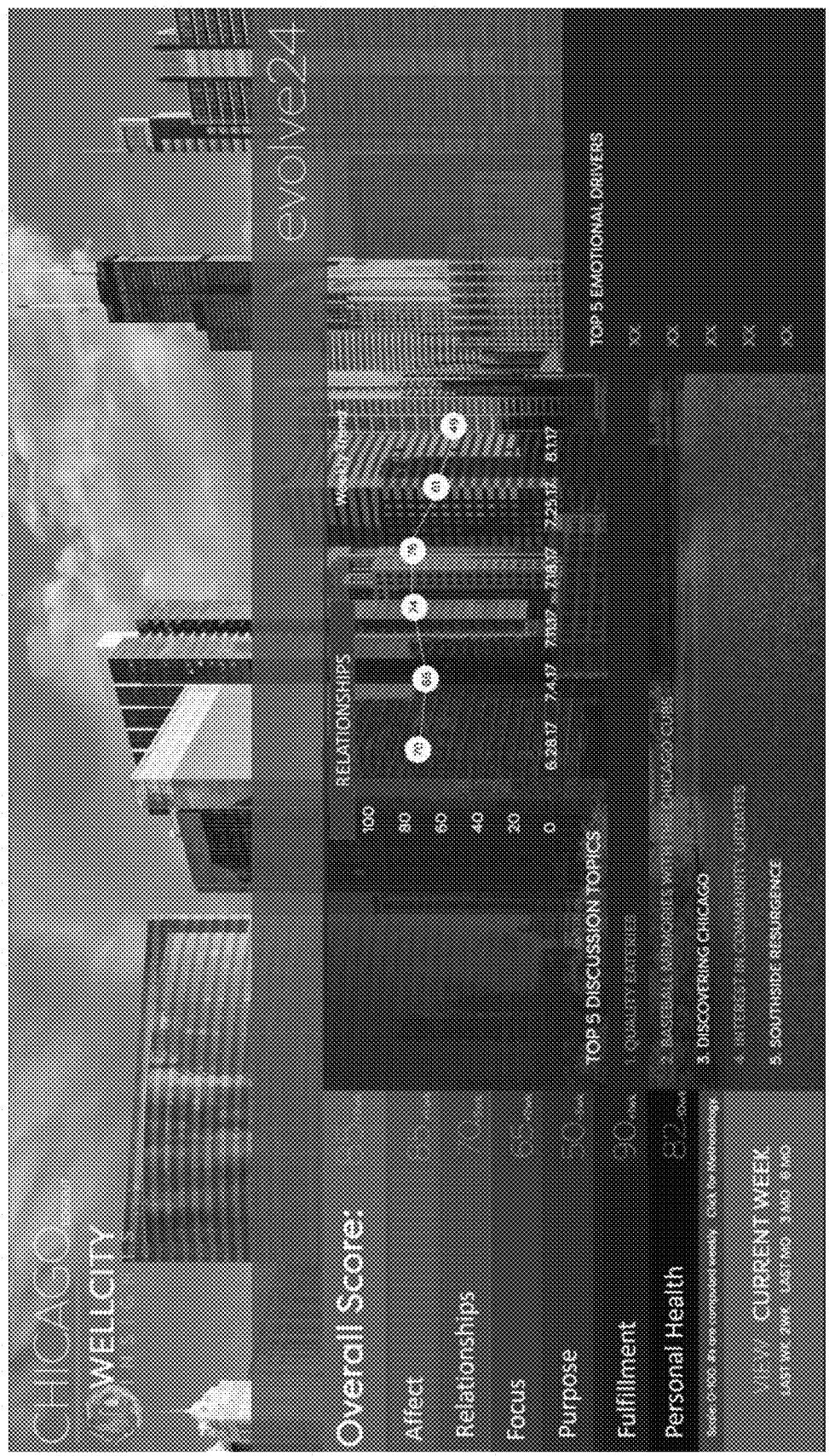
FIG. 5 illustrates an example user interface of a web application displayed by a client computing device according to an example embodiment.

FIG. 5 shows a screenshot 500 of an example user interface generated by the subjective wellbeing analytics application 108 according to an example embodiment. The subjective wellbeing server computing device 102 may transmit data and information associated with the user interface to the client computing device 104 for display. As shown in FIG. 5, the user interface is associated with the subjective wellbeing analytics for the city of Chicago. The subjective wellbeing analytics score is currently 85. The Affect score is currently 85, the Relationships score is currently 70, the Focus score is currently 65, the Purpose score is currently 50, the Fulfillment score is currently 90, and the Personal Health score is currently 82. In addition, the screenshot 500 shows a graph of the Relationships score from Jun. 28, 2017 to Aug. 1, 2017. The screenshot 500 also shows a list of top discussion topics including Quality Eateries, Baseball Memories with the Chicago Cubs, Discovering Chicago, Interest in Community Updates, and Southside Resurgence. The screenshot also may show a list of top emotional drivers.

Figure 6:
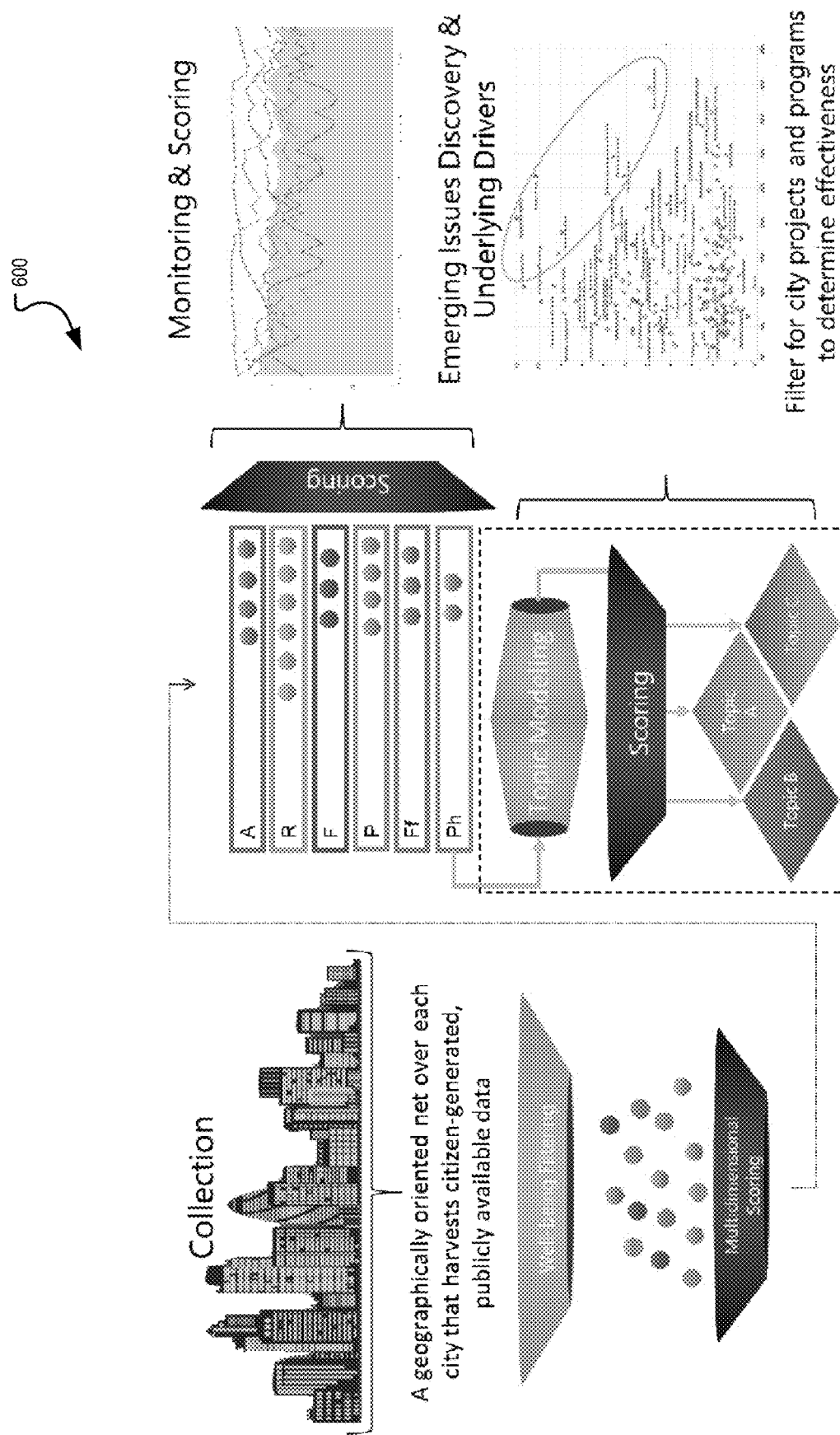
FIG. 6 illustrates a flow diagram of the system for generating the subjective wellbeing analytics score according to an example embodiment.

FIG. 6 illustrates a flow diagram 600 of the subjective wellbeing analytics system 100 according to an example embodiment. As shown in FIG. 6, the subjective wellbeing analytics application 108 of the subjective wellbeing server computing device 102 may collect the at least one document associated with a metropolitan area associated with a particular period of time to harvest citizen-generated publicly available data using the well-being filtering and perform the multidimensional scoring of each of the dimensions. Based on the multidimensional scoring, the subjective wellbeing analytics application may provide a score for each of the six subjective wellbeing dimensions and an overall score that is based on each of the subjective wellbeing dimensions. These scores may be graphed. In addition, the subjective wellbeing analytics application 108 may determine one or more emerging issues and topics during a particular period of time based on the at least one document as discussed above using LDA processing, another clustering method, or another clustering approach.

FIG. 7 shows example tables of data 700 associated with the system according to an example embodiment. A first example table 702 is associated with an example bin for the Fulfillment dimension according to an example embodiment. As shown in the table 702, there is a volume column that indicates a number of documents for the corpus, a binned raw score column, a city column, a bin_dimension column, a week column, a dimension score column, and a smoothed dimension score column.

A second example table 704 is associated with an example bin for the Fulfillment dimension according to an example embodiment. As shown in the table 704, there is a fulfillment column, a topic_name column, an importance column, a volume column that indicates a number of documents for the corpus, a sentiment column, a positive column, a neutral column, a negative column, and an overall risk column.

A third example table 706 shows a topic column, a sentiment column, a dimension column, a relevant column, an absolute value of the relevant column, a fulfillment dimension score column, an affect dimension score column, a focus dimension score column, a health dimension score column, a purpose dimension score column, and a relationships dimension score column.

Figure 8:
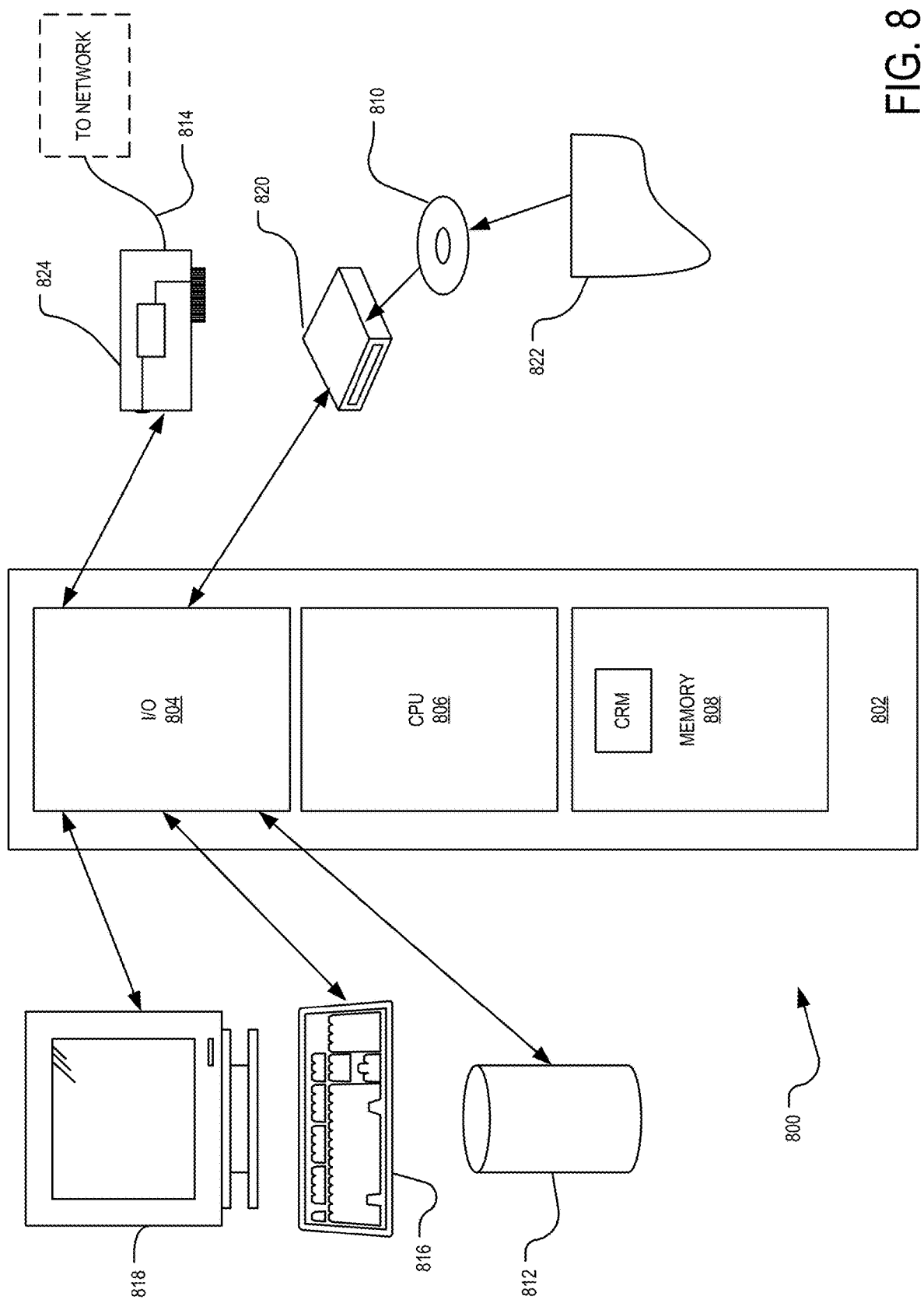
FIG. 8 illustrates a block diagram of a computing device according to an example embodiment.

FIG. 8 illustrates an example computing system 800 that may implement various systems, such as the subjective wellbeing server computing device 102 and the client computing device 104, and the methods discussed herein, such as process 300. A general purpose computer system 800 is capable of executing a computer program product to execute a computer process. Data and program files may be input to the computer system 800, which reads the files and executes the programs therein such as the subjective wellbeing analytics application 108. Some of the elements of a general purpose computer system 800 are shown in FIG. 8 wherein a processor 802 is shown having an input/output (I/O) section 804, a central processing unit (CPU) 806, and a memory section 808. There may be one or more processors 802, such that the processor 802 of the computer system 800 comprises a single central-processing unit 806, or a plurality of processing units, commonly referred to as a parallel processing environment. The computer system 800 may be a conventional computer, a server, a distributed computer, or any other type of computer, such as one or more external computers made available via a cloud computing architecture. The presently described technology is optionally implemented in software devices loaded in memory 808, stored on a configured DVD/CD-ROM 810 or storage unit 812, and/or communicated via a wired or wireless network link 814, thereby transforming the computer system 800 in FIG. 8 to a special purpose machine for implementing the described operations.

The memory section 808 may be volatile media, nonvolatile media, removable media, non-removable media, and/or other media or mediums that can be accessed by a general purpose or special purpose computing device. For example, the memory section 808 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 804 is connected to one or more user-interface devices (e.g., a keyboard 816 and a display unit 818), a disc storage unit 812, and a disc drive unit 820. Generally, the disc drive unit 820 is a DVD/CD-ROM drive unit capable of reading the DVD/CD-ROM medium 810, which typically contains programs and data 822. Computer program products containing mechanisms to effectuate the systems and methods in accordance with the presently described technology may reside in the memory section 804, on a disc storage unit 812, on the DVD/CD-ROM medium 810 of the computer system 800, or on external storage devices made available via a cloud computing architecture with such computer program products, including one or more database management products, web server products, application server products, and/or other additional software components. Alternatively, a disc drive unit 820 may be replaced or supplemented by another storage medium drive unit. The network adapter 824 is capable of connecting the computer system 800 to a network via the network link 814, through which the computer system can receive instructions and data. Examples of such systems include personal computers, Intel or PowerPC-based computing systems, AMD-based computing systems, ARM-based computing systems, and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 800 is connected (by wired connection and/or wirelessly) to a local network through the network interface or adapter 824, which is one type of communications device. When used in a WAN-networking environment, the computer system 800 typically includes a modem, a network adapter, or any other type of communications device for establishing communications over the wide area network. In a networked environment, program modules depicted relative to the computer system 800 or portions thereof, may be stored in a remote memory storage device. It is appreciated that the network connections shown are examples of communications devices for and other means of establishing a communications link between the computers may be used.

In an example implementation, source code executed by the subjective wellbeing server computing device 102, the client computing device 104, a plurality of internal and external databases, source databases, and/or cached data on servers are stored in memory of the subjective wellbeing server computing device 102, memory of the client computing device 104, or other storage systems, such as the disk storage unit 812 or the DVD/CD-ROM medium 810, and/or other external storage devices made available and accessible via a network architecture. The source code executed by the subjective wellbeing server computing device 102 and the client computing device 104 may be embodied by instructions stored on such storage systems and executed by the processor 802.

Some or all of the operations described herein may be performed by the processor 802, which is hardware. Further, local computing systems, remote data sources and/or services, and other associated logic represent firmware, hardware, and/or software configured to control operations of the subjective wellbeing analytics system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 802 and a user may interact with a Graphical User Interface (GUI) using one or more user-interface devices (e.g., the keyboard 816, the display unit 818, and the user devices 804) with some of the data in use directly coming from online sources and data stores. The system set forth in FIG. 8 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
   a memory having instructions stored thereon;
   at least one processor to execute the instructions to:
   collect at least one document from at least one document source, the at least one document associated with a particular geographic location based on a geofence that includes geographical boundaries and a particular period of time;
   insert the at least one document into a queue for processing, store the at least one document in a data lake, and assign the at least one document an index;
   perform natural language processing on the at least one document to obtain text from the at least one document and assign the at least one document to at least one subjective wellbeing dimension by comparing the text from the at least one document with a subjective wellbeing dimension filter for each subjective wellbeing dimension, wherein the at least one subjective wellbeing dimension comprises Affect, Relationships, Focus, Purpose, Fulfillment, and Personal Health;
   insert the at least one document into at least one bin, each bin associated with a particular subjective wellbeing dimension; and
   analyze each document in each bin associated with the particular subjective wellbeing dimension to determine a score for each subjective wellbeing dimension comprising Affect, Relationships, Focus, Purpose, Fulfillment, and Personal Health and an overall score that is based on each score for each subjective wellbeing dimension including a score for each of Affect, Relationships, Focus, Purpose, Fulfillment, and Personal Health.

2. The system of claim 1, the at least one processor further to determine whether the document is one of negative, positive, and neutral for each of the at least one subjective wellbeing dimension.

3. The system of claim 1, the at least one processor further to analyze the at least one document to determine a topic that is common throughout the at least one document.

4. The system of claim 1, the at least one processor further to receive the at least one document in a realtime stream using a web application programming interface (API) provided by at least one server computing device.

5. The system of claim 1, the at least one processor further to transmit the score for each subjective wellbeing dimension and the overall score that is based on each score for each subjective wellbeing dimension to a client computing device for display on a graphical user interface (GUI).

6. The system of claim 1, wherein the at least one document source comprises at least one of a social media platform, a blog, a message board, a forum, a news site, a review site, and a web feed.

7. A method comprising:
   collecting, by at least one processor, at least one document from at least one document source, the at least one document associated with a particular geographic location based on a geofence that includes geographical boundaries and a particular period of time;
   inserting, by the at least one processor, the at least one document into a queue for processing, storing the at least one document in a data lake, and assigning the at least one document an index;
   performing, by the at least one processor, natural language processing on the at least one document to obtain text from and assigning the at least one document to at least one subjective wellbeing dimension by comparing the text from the at least one document with a subjective wellbeing dimension filter for each subjective wellbeing dimension, wherein the at least one subjective wellbeing dimension comprises Affect, Relationships, Focus, Purpose, Fulfillment, and Personal Health;

inserting, by the at least one processor, the at least one document into at least one bin, each bin associated with a particular subjective wellbeing dimension; and analyzing, by the at least one processor, each document in each bin associated with the particular subjective wellbeing dimension to determine a score for each subjective wellbeing dimension comprising Affect, Relationships, Focus, Purpose, Fulfillment, and Personal Health and an overall score that is based on each score for each subjective wellbeing dimension including a score for each of Affect, Relationships, Focus, Purpose, Fulfillment, and Personal Health.

8. The method of claim 7, further comprising determining whether the document is one of negative, positive, and neutral for each of the at least one subjective wellbeing dimension.

9. The method of claim 7, further comprising analyzing the at least one document to determine a topic that is common throughout the at least one document.

10. The method of claim 7, further comprising receiving the at least one document in a realtime stream using a web application programming interface (API) provided by at least one server computing device.

11. The method of claim 7, further comprising transmitting the score for each subjective wellbeing dimension and the overall score that is based on each score for each subjective wellbeing dimension to a client computing device for display on a graphical user interface (GUI).

12. The method of claim 7, wherein the at least one document source comprises at least one of a social media platform, a blog, a message board, a forum, a news site, a review site, and a web feed.

13. A non-transitory computer-readable storage medium, having instructions stored thereon that, when executed by a computing device cause the computing device to perform operations, the operations comprising:

collecting at least one document from at least one document source, the at least one document associated with a particular geographic location based on a geofence that includes geographical boundaries and a particular period of time;

inserting the at least one document into a queue for processing, storing the at least one document in a data lake, and assigning the at least one document an index;

performing natural language processing on the at least one document to obtain text from the at least one document and assigning the at least one document to at least one subjective wellbeing dimension by comparing the text from the at least one document with a subjective wellbeing dimension filter for each subjective wellbeing dimension, wherein the at least one subjective wellbeing dimension comprises Affect, Relationships, Focus, Purpose, Fulfillment, and Personal Health;

inserting the at least one document into at least one bin, each bin associated with a particular subjective wellbeing dimension; and analyzing each document in each bin associated with the particular subjective wellbeing dimension to determine a score for each subjective wellbeing dimension comprising Affect, Relationships, Focus, Purpose, Fulfillment, and Personal Health and an overall score that is based on each score for each subjective wellbeing dimension including a score for each of Affect, Relationships, Focus, Purpose, Fulfillment, and Personal Health.

14. The non-transitory computer-readable medium of claim 13, the operations further comprising determining whether the document is one of negative, positive, and neutral for each of the at least one subjective wellbeing dimension.

15. The non-transitory computer-readable medium of claim 13, the operations further comprising analyzing the at least one document to determine a topic that is common throughout the at least one document.

16. The non-transitory computer-readable medium of claim 13, the operations further comprising receiving the at least one document in a realtime stream using a web application programming interface (API) provided by at least one server computing device.

17. The non-transitory computer-readable medium of claim 13, the operations further comprising transmitting the score for each subjective wellbeing dimension and the overall score that is based on each score for each subjective wellbeing dimension to a client computing device for display on a graphical user interface (GUI).

18. The non-transitory computer-readable medium of claim 13, wherein the at least one document source comprises a social media platform, a blog, a message board, a forum, a news site, a review site, and a web feed.

* * * * *